(12) United States Patent
Shaub, Sr. et al.

(10) Patent No.: US 8,714,980 B1
(45) Date of Patent: May 6, 2014

(54) INFLATABLE AIRCRAFT TRAINER AND METHOD TO USE

(71) Applicants: Robert L. Shaub, Sr., Ocala, FL (US); Mark Nick, Ocala, FL (US); Allen Craig, Dunnelon, FL (US); Ross Riddell, Ocala, FL (US)

(72) Inventors: Robert L. Shaub, Sr., Ocala, FL (US); Mark Nick, Ocala, FL (US); Allen Craig, Dunnelon, FL (US); Ross Riddell, Ocala, FL (US)

( * ) Notice: Subject to any disclaimer, the term of this patent is extended or adjusted under 35 U.S.C. 154(b) by 14 days.

(21) Appl. No.: 13/645,611

(22) Filed: Oct. 5, 2012

(51) Int. Cl.
*G09B 19/16* (2006.01)

(52) U.S. Cl.
USPC .......................................................... 434/30

(58) Field of Classification Search
USPC ......................... 434/29–72; 244/117 R, 137.2
See application file for complete search history.

(56) References Cited

U.S. PATENT DOCUMENTS

| | | | |
|---|---|---|---|
| 2005/0058965 A1* | 3/2005 | Bigelow | 434/34 |
| 2011/0200974 A1* | 8/2011 | Gluck | 434/30 |

* cited by examiner

*Primary Examiner* — Timothy A Musselman
(74) *Attorney, Agent, or Firm* — Lawrence J. Gibney, Jr.

(57) ABSTRACT

One of the challenges for airports is to provide effective emergency response training in the event of aircraft emergency scenarios. For airports there is the additional expense to provide that training that is typically performed at a remote facility. A portable inflatable training aircraft will provide this training and reduces the cost to the airport management so that the training can be ongoing and effective without interfering with the normal operation of the airport.

8 Claims, 5 Drawing Sheets

INFLATABLE AIRCRAFT TRAINER AND METHOD TO USE

BACKGROUND OF THE INVENTION

A. Field of the Invention

This Inflatable Aircraft Training device relates to training at airports, specifically training for firefighters in the event of an emergency incident. Representative emergency situations include aircraft fires, most common at the engines and fluid leaks including hydraulic and jet fuel.

It is currently mandated by the Federal Aviation Administration that firefighters at certificated airports must undergo Hot Fire Training every year.

One of the major challenges for airports is the cost of sending personnel to remote locations to train on life size aircraft. The airport firefighter today has limited opportunity of training on proficiency and firefighting agent application due to the unavailability of a life-size aircraft. This training aircraft will supply multiple training scenarios to train in firefighting tactics and extinguishing agent application proficiency, in order to enhance the operational skills of the ARFF vehicle operators thereby promoting the protection of the incident scene.

Although the primary focus on the firefighter approaching an aircraft in distress is to safely evacuate the passengers on board the aircraft, the firefighter must first address all emergency situations and safely contain them. This is typically done from the outside of the aircraft in the event of a fire or fuel leak.

Agent quantity requirements on ARFF fire apparatus have been a topic of discussion for many years in the industry standards committees due to the application and proficiency of the firefighter to apply agent quickly and accurately to the aircraft in distress.

The need for a realistic aircraft tactical trainer to represent a life size target is a tool the fire fighter can utilize on a daily basis if so desired to assist in their required proficiency of agent application and tactical rescue procedures.

This device provides the opportunity for all airports to provide additional training on a year round basis in addition to the mandated annual training. The device is an inflatable aircraft that is roughly the same size as a Boeing 737, a commonly used aircraft although different sized aircraft may be used. With the mobile base version the device can be transported from point to point on airport property, and it can be inflated and deflated as required.

The Boeing 737 aircraft is discussed because it is a prevalent aircraft at most airports.

Currently, there are no inflatable trainers in existence for this purpose.

B. Prior Art

With regard to inflatable devices, there are many inflatable devices for entertainment and recreational purposes as well as certain training devices. Most of these devices are for entertainment uses such as the commonly seen Bouncy House that can be seen at children's parties of Fall Festivals.

However the Bain U.S. Pat. No. 3,106,373 is an inflatable aircraft but is not used for training purposes. Similarly the Giffin U.S. Pat. No. 4,013,247 is a patent that teaches the functions of the airplane slide but does not address or teach features related to an inflatable aircraft from training purposes.

Other references in this area include Henne 2002/0185569 and Mau 2008/0083847 and teach various features of the use of airplanes. However, none of the prior references teach the use of an inflatable aircraft for training purposes.

BRIEF SUMMARY OF THE INVENTION

The device, which is an inflatable training device, is designed to be the approximate size of an actual aircraft when the device is inflated, for accurate simulation during training exercises. The device may be of portable or fixed base design and the specific type of device will depend in large part on the needs of the particular airport or training facility and the training requirements. It is contemplated that the device may be housed on a trailer with all required accessories. However, it may also be a fixed based system where the device could be permanently secured to the ground in one area of the airport, possibly with a concrete foundation.

The device may be of various sizes depending on the specific index or category of certificated and non-certificated airports. For instance, a smaller airport may require a small regional aircraft design whereas a large metropolitan airport may require a large body aircraft design to simulate emergency scenarios in different locations. For purposes of this application the device will be described but not limited to the relative dimensions of a Boeing 737, which is a common aircraft and can be found at many airports both domestically and internationally.

The device is capable of providing specific areas of training depending on the requirements of a particular airport. This will enable firefighters the opportunity to train for simulated emergency scenarios involving an aircraft. Additionally it will also provide training opportunities for employees of airlines and other mutual aid emergency services such as police, off airport, or military personnel.

The device will permit the emergency personnel to train for specific types of emergency scenarios based on wind and environmental conditions and or geographic considerations at a particular airport. For instance the geography in Denver is significantly different than the geography in Miami and the specific firefighting concerns are substantially different.

Because this is an aircraft training device it will comply with all regulations regarding the use of training devices. This may include compliance with Federal Aviation Administration (FAA), Department of Transportation (DOT), Homeland Security, Civil Aviation Authority (CAA), and any applicable Authorities Having Jurisdiction (AHJ).

Regardless of whether this is a mobile or fixed base design, the inflatable trainer should be rapidly inflated and deflated to maximize the time allotted for training purposes. The device should be constructed of materials that are resistant to the environment.

The device will be housed on an appropriate mobile or fixed base and may or may not have certain detachable sections due to manufacturing procedures and application. Should detachable sections be applicable the device may have attachments such as a forward nose section, fuselage section, left wing section, right wing section, and tail section. Because it is a training device, the wing and tail sections may be shortened or modified because they are not required in all scenarios to be the usual length or height and would only serve to provide undue stress on the trainer in the event of excessive wind gusts. At any airport there are fluctuations in wind conditions and appropriate considerations must be taken. Because this is an inflatable device and therefore significantly lighter than an actual Boeing 737, it may be subject to wind conditions. Ballast devices may be placed at multiple locations on the underside of the aircraft to provide weight, preventing the device from being distorted or otherwise affected.

The portable base design may incorporate a trailer that can be transported by existing airport equipment such as fire apparatus, pick-up truck, or other suitable means. The mobile conveyance should be constructed of materials that will be resistant to the elements and permit appropriate storage of the inflatable device. The mobile conveyance may have collapsible sides so that the device can be quickly and easily stored and effectively protected in the deflated mode. The mobile conveyance may contain compartments to house sub system equipment utilized for the operation of the device such as inflation and deflation, simulated fire and smoke, and optional fluid spills in order to realistically depict emergency scenarios. Power to operate the portable base design can be supplied by either an onboard generator or supplied from an external source. The portable base design is intended to provide movement of the device to various locations on and off the airport or training facility property dependent upon the intended training scenario and allow rapid deployment and stowage of the device.

Because the portable base design may travel on roads, the mobile conveyance may be DOT certified for transportation of the aircraft trainer and all associated equipment.

The fixed base design should be constructed of materials that will be resistant to the elements and permit appropriate storage of the inflatable device. The fixed base design may have collapsible sides so that the device can be quickly and easily stored and effectively protected in the deflated mode. The fixed base design may contain compartments to house sub system equipment utilized for the operation of the device such as inflation and deflation, simulated fire and smoke, and optional fluid spills in order to realistically depict emergency scenarios. Power to operate the fixed base design can be supplied by either an onboard generator or supplied from an external source. The fixed base design will comply with all applicable building codes.

Both portable and fixed base designs may contain the required sub systems needed for operation of the device. Such systems may include a generator(s) to provide power, a blower(s) for inflation and deflation of the device, a smoke generator(s) to produce a simulated fire condition, an optional fluid transfer pump(s) to simulate fluid spills and facilitate filling of the ballast, optional lighting as may be required to operate the device in low light or night conditions, and hydraulic systems that may be used to open and close the retractable enclosure.

All required air, liquid, and electrical means will be provided to insure that the device can be properly operated. These may include a manifold system for distribution of air to the device sections individually and for simulated fire and smoke to appropriate areas of the device for realistic simulation of actual incidents common to emergency scenarios.

A controller will also be used to activate and manage the individual sub systems. The controller may be either tethered via a control harness or be wireless. The controller may control inflation and deflation of the device, remote start and operation of generator(s), simulated fire and smoke distribution, simulated fuel or hydraulic leaks, and transfer of fluid to ballast points. The controller may monitor such functions as inflation air pressure internal in the device sections, smoke flow rates and dispersion points, and simulated fluid leak flow rates.

Training options for the inflatable trainer may include an inflatable evacuation slide for egress training, fuel and hydraulic spill training, aircraft system shutdown training, and variable smoke color training.

An optional inflatable slide that permits passengers to exit the plane may be provided at either the front left or right doors of the aircraft. Currently training on the use of the evacuation slide is limited as it is relatively expensive to deploy an actual evacuation slide and cannot be used again until repackaged and certified. The optional inflatable evacuation slide can be deployed as often as required so that slide training can be achieved at every training opportunity.

Fuel and hydraulic spill training may be accomplished by pumping liquid through the interior of the device to specific locations common to incidents of this type.

Aircraft system shutdown training may include representative controls and locations for standard shut down procedures. These aircraft systems may include the auxiliary power unit (APU), battery disconnects, and fuel shut offs.

Variable smoke color training may include the ability to distribute different colored smoke representative of varying types of combustibles.

NUMBERING DESCRIPTION

Figure 1:
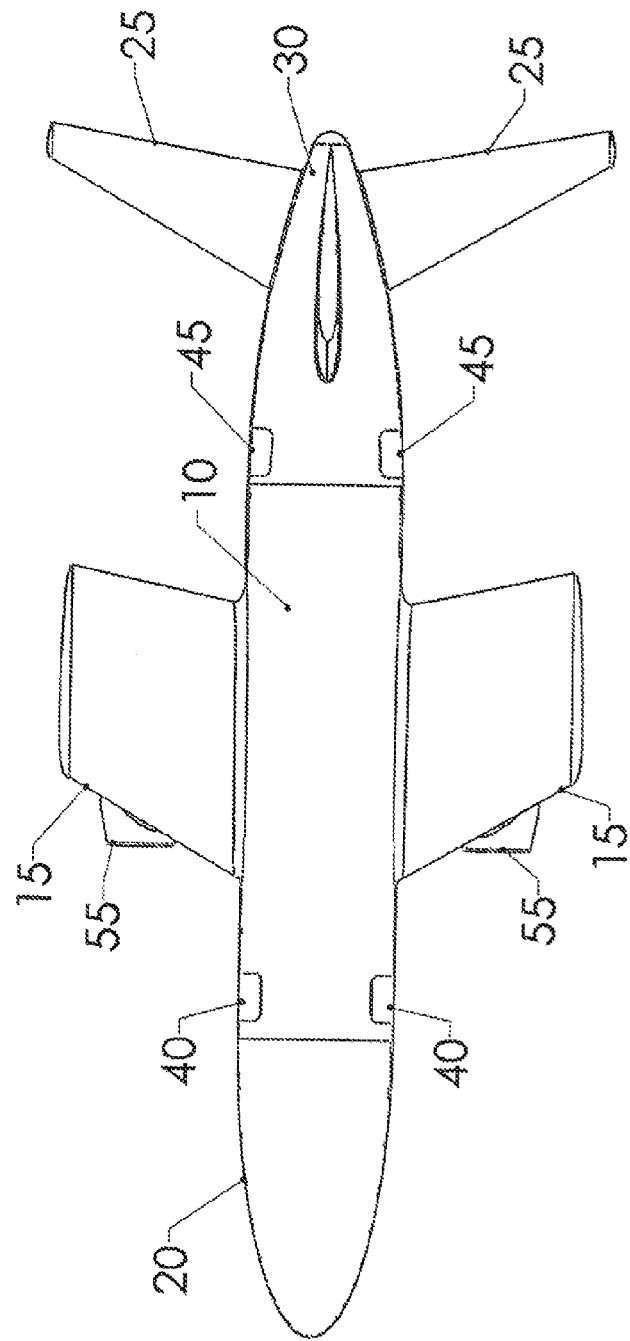
FIG. 1 is a top view of the training device.
Figure 2:
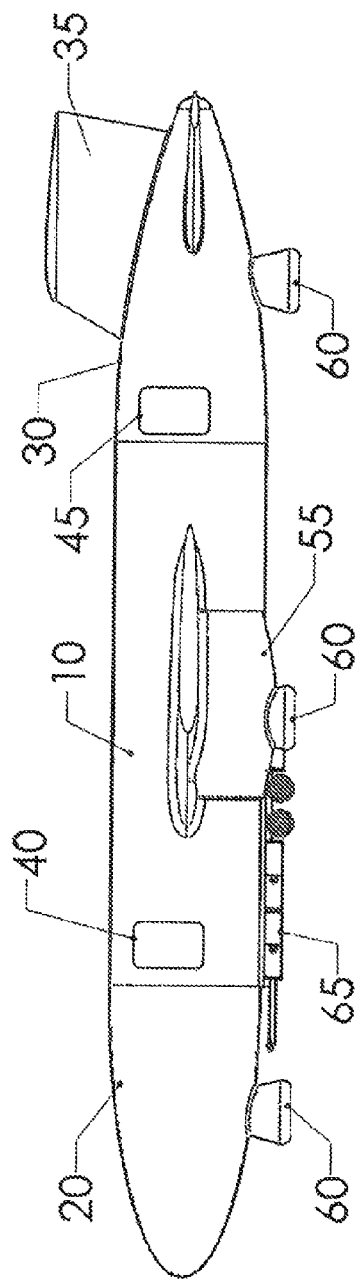
FIG. 2 is a side view of the training device.

10—Fuselage Section
15—Wing (Short)
16—Wing (Long)
20—Nose Section
25—Horizontal Stabilizer
30—Tail Section
35—Vertical Stabilizer
40—Front Door
45—Rear Door
55—Engine
60—Ballast vessels
65—Trailer
70—Controller
75—Power Supply
80—Antenna
85—Alarms
90—Blower
95—Smoke Generator
100—Slide

DETAILED DESCRIPTION OF THE EMBODIMENTS

The inflatable aircraft training device or simply training device is a portable inflatable aircraft that will be used for training purposes. Specifically the device will be used to train ARFF firefighters or other emergency personnel in the event of an airplane incident.

Representative examples of emergency incidents include an airplane fire, airplane fuel leak, hostage situation or a ditched or tilted airplane and do not necessarily include just an aircraft fire but also situations where the passengers may require safe evacuation. The paramount concern regardless of the situation is to safely evacuate the passengers on board the aircraft.

For purposes of the application the training device will be the approximate size of a Boeing 737 which is a very common aircraft in use today but this training device will be applicable to other sizes of aircraft including propeller as well as rotary wing aircraft.

When the device is not deployed, it will most likely be housed on a trailer 65 of predetermined dimensions. On the undercarriage of the trailer will be various pieces of equipment, including a generator(s) 75 to provide power, a blower(s) 90, a smoke machine(s) 95, and alarm(s) 85 operated via the controller 70. Additionally there may be an adequate supply of fluid on the trailer in order to fill the ballast vessels 60. The blower 90 or plurality of blowers will allow the device to be inflated and also inflate the slide 100 when and if needed. The smoke machine(s) 95 will produce smoke within the body of the aircraft to simulate a real fire scenario.

The controller 70 can be operational at the scene or can be operated remotely through use of an antenna 80. An appropriate power supply 75 is provided for that purpose.

Appropriate plumbing and electrical system connections will be provided in order to funnel smoke into the body of the aircraft to simulate a fire or a power outage or a loss of power situation. A manifold system may be used to funnel the smoke to different areas through the interior of the aircraft. Other devices may also be included to simulate other types of emergency scenarios.

The training device may come in multiple sections, depending on the size of the aircraft. A nose section 20, a fuselage section 10, a tail section 30, a left wing and a right wing 15 will be attached to the fuselage section 10.

In one embodiment the wings 15 will be shortened such as depicted in FIG. 1 to just past the mounting posts for the engines for ease of transport and storage; additionally because this device is significantly lighter than an actual aircraft the shorter wings lessen any disturbance from gusts of wind during a training exercise.

A representation of an engine 55 will be attached to the underside of the wings where they are normally placed on the aircraft. Because this is a portable inflatable training device the engines will be representations and not actual engines.

In another embodiment the wings will be the standard length of a wing 16 to simulate tip to tip wing collisions, which is the most common type of collision when the aircraft are on the ground.

On the underside of the wings will be a plurality of ballast vessels 60 that are used as a means to place ballast, if needed. Because this device is designed to be lightweight some means to insure that the device remains relatively unaffected by excessive winds is provided by the ballast vessels 60. The ballast vessels 60 will be filled with applicable liquid and a dump valve will be provided for a quick means to empty the ballast vessels 60.

A vertical stabilizer 35 as well as a pair of horizontal stabilizers 25 will be attached to the tail section 30. The vertical stabilizer will be shortened to prevent undue stress to the trainer from excessive wind.

The horizontal stabilizers 25 may be shortened for storage and transport considerations.

Figure 3:
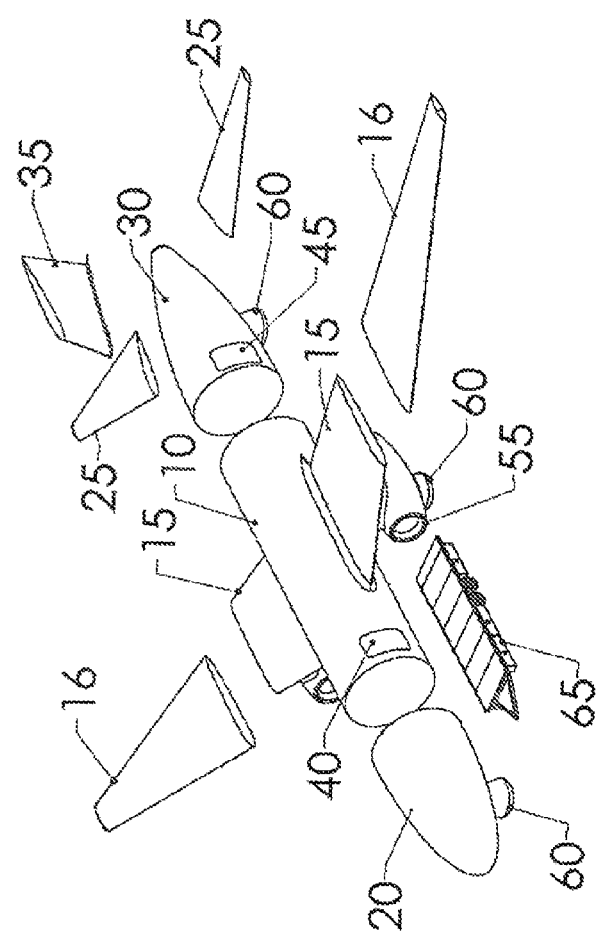
FIG. 3 is an isometric exploded view of the training device depicting the trailer.
Figure 4:
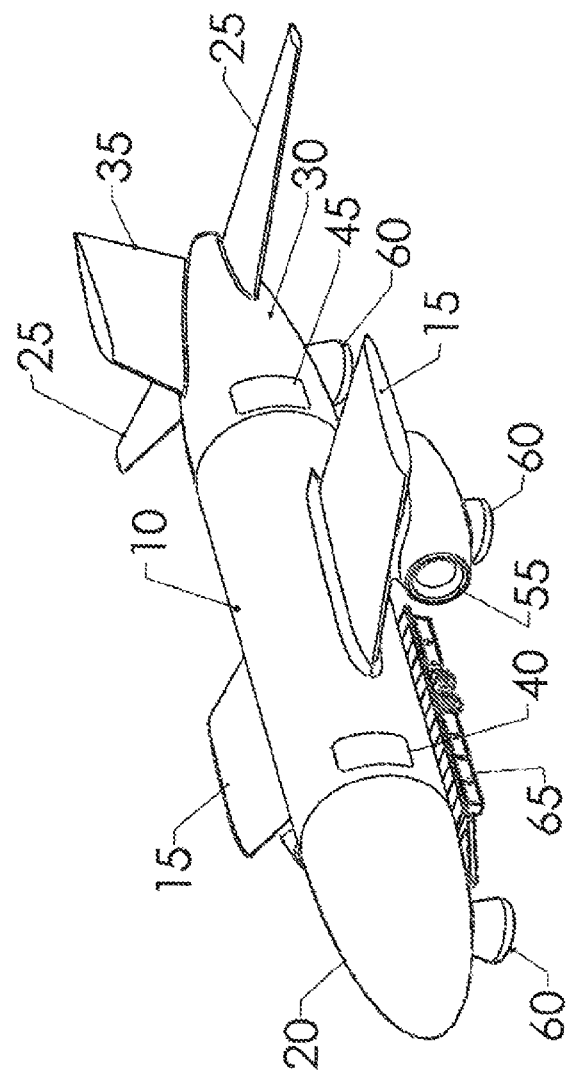
FIG. 4 is an isometric view of the training device on the trailer.
Figure 5:
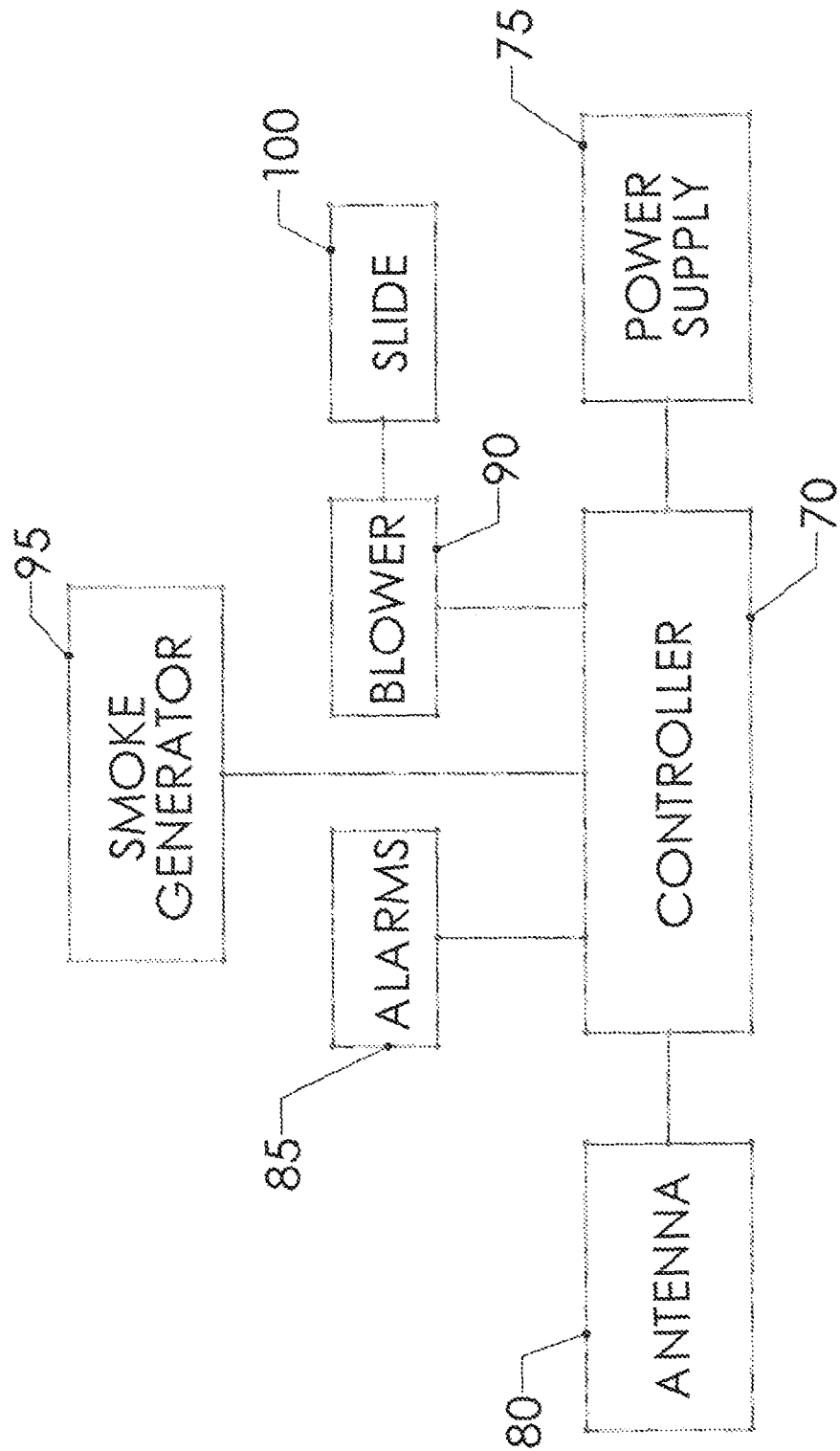
FIG. 5 is a schematic of the components of the device.

These sections—nose, fuselage, wings, tail and attached features—will be placed on a suitable frame and are connected together. Each of the sections can detach from each other such as depicted in FIG. 3 to tailor the specific training needs of a particular situation or airport, if desired. Additionally because each of the sections can detach it makes replacing and servicing individual sections less complex. No particular means of connection is being claimed.

Additionally, there is an optional slide 100 from the front left or right 40 of the training device. The slide 100 will be used as a training representation to allow simulated egress from the aircraft. The slide 100 that is to be used can be inflated using the blower equipment that is placed on the trailer. When deployed, the slide will extend from the bottom of the door to the ground surface to simulate real life conditions. The slide 60 can be easily inflated and deflated depending on a particular training need and can be used for training purposes on a repeated basis, unlike the slide that is found in a commercial aircraft that can only be used once before it needs to be replaced.

The training device may be a portable or fixed base design. The advantage of a portable trainer is that it allows an airport to simulate emergency situations at different locations on the airport property. The device will be secured to a trailer 65, that is equipped with a plurality of wheels and the trailer can be transported by existing airport equipment such as fire apparatus, pick-up truck, or other suitable means and it is designed to be lightweight and extremely portable. Wheels are provided on the trailer for that purpose.

A fixed base design may also be useful, however, to provide ongoing training opportunities without the need to move the device and set up the device so that it does not interfere with normal airport activity.

Because the device will be subjected to extreme environmental conditions, a plurality of ballast vessels 60 will be provided to provide a secure foundation for the device and prevent the device from being distorted or otherwise affected by excessive wind and environmental conditions. These ballast vessels 60 will be attached to the underside of the training device and there may be multiple locations to place the ballast to simulate different scenarios e.g. a tilted plane.

Additionally, because there will be extreme temperatures, particularly cold, the device will have an appropriate measure to insure that the ballast, which is fluid, and other parts of the training device do not freeze during a normal training exercise.

A controller 70 will also be used to simulate possible emergency scenarios and will also allow the event to be evaluated once the situation has been appropriately addressed by the emergency personnel. For instance, if the training is to include a simulated fire on board an aircraft a simulation of fire is provided (including smoke); for obvious reasons a real fire is not started. Once the fire has been "extinguished" or placed under control, the controller operator will automatically disengage the simulated fire. These disaster scenarios can be controlled remotely through the use of a controller 70 and antenna 80.

When the portable training device is used it will be towed to a designated location for purposes of training. The device will then be inflated and the tow motor or other towing device will likely be detached. During the training exercise, the device will remain inflated by the generator(s) 75 and blower(s) 90 on the trailer.

In this matter, emergency personnel can simulate a variety of different emergency situations, including fuel spills, fire, engine fire, building or aircraft collisions, terrorist threat or landing-simulated fire.

Because the device can be towed to a specific location at a given airport, the emergency personnel will be trained on their airport property as opposed to generic training during the annual training requirement. This will insure that the emergency personnel are familiar with a specific airport as opposed to a generic airport.

Although a Boeing 737 has been described, this training device may be any type of aircraft, including civilian, rotary wing and military aircraft, for the purpose of training for different emergency situations.

While the embodiments of the invention have been disclosed, certain modifications may be made by those skilled in the art to modify the invention without departing from the spirit of the invention.

The inventors claim:
1. An inflatable aircraft training device comprised of:
 a. a nose section;
  wherein the nose section is at the front of the device;
  wherein a pair of doors is located on the nose section;
 b. a fuselage section;
  wherein the fuselage section is in the center of the device;
  wherein a pair of wings is attached to the fuselage section;
 c. a tail section;
  wherein the tail section is at the rear of the device;
  wherein a pair of horizontal stabilizers is attached to the tail section;
  wherein a vertical stabilizer is attached to the tail section;
  wherein the sections are connected together;
 d. a plurality of representations of engines;
  wherein the plurality of the representations of the wings;
 e. a trailer of predetermined dimensions;
  wherein the trailer secures the device;
  wherein a plurality of wheels is located on the trailer;
 f. a plurality of generators;
  wherein the plurality of generators supplies power to all devices required to operate the device;
  wherein said plurality of generators is stowed on the trailer;
 g. a plurality of smoke machines;
  wherein the plurality of smoke machines emits smoke;
  wherein the plurality of smoke machines is stowed on the trailer;
 h. a controller;
  wherein the controller controls the discharge of smoke to predetermined designated areas;
  wherein the controllers regulate the air supply to predetermined designated areas;
 i. an antenna;
  wherein an antenna is configured to operate the controller;
 j. alarms;
  wherein the system comprises a plurality of alarms;
 k. a plurality of ballast vessels;
  wherein the plurality of ballast vessels is of a predetermined size;
  wherein a predetermined amount of fluid is placed in the ballast vessels;
  wherein a dump valve is placed on the plurality of ballast vessels to empty the plurality of ballast vessels;
 l. a slide;
  wherein a slide is located at the doors of the device;
  wherein the slide can be inflated;
  further comprising a means to deflate the slide.

2. The device as described in claim 1 wherein the device is portable.

3. The device as described in claim 1 wherein the device is stationary.

4. The device as described in claim 1 wherein the aircraft is a jet.

5. The device as described in claim 1 wherein the aircraft is a propeller aircraft.

6. The device as described in claim 1 wherein the aircraft is a rotary wing aircraft.

7. The device as described in claim 1 wherein the wings are shortened a predetermined amount.

8. The device as described in claim 1 wherein the wings are full length wings.

* * * * *